United States Patent
Goto et al.

[19]

[11] Patent Number: 6,099,167
[45] Date of Patent: Aug. 8, 2000

[54] WHEEL BEARING

[75] Inventors: Masaru Goto, Yamatokoriyama; Eiji Murata, Kashiwara; Nobuyuki Seo, Yamotokoriyama; Tomohiro Ishii, Yamatotakada, all of Japan

[73] Assignee: Koyo Seiko Co., Ltd., Osaka, Japan

[21] Appl. No.: 09/210,802

[22] Filed: Dec. 15, 1998

[30] Foreign Application Priority Data

Dec. 16, 1997 [JP] Japan ................................ 9-346159

[51] Int. Cl.[7] ............................................... F16C 33/30
[52] U.S. Cl. ........................ 384/544; 301/105.1; 384/537
[58] Field of Search .................. 384/544, 542, 384/589, 584, 515, 537, 543; 301/105.1; 29/894.36, 894.361, 844.362

[56] References Cited

U.S. PATENT DOCUMENTS

| | | | |
|---|---|---|---|
| 4,019,789 | 4/1977 | Rosin et al. ............................ | 384/543 |
| 4,179,167 | 12/1979 | Lura et al. ............................... | 384/512 |
| 5,100,247 | 3/1992 | Woehler .................................. | 384/544 |
| 5,727,886 | 3/1998 | Hata et al. .............................. | 384/537 |
| 5,797,686 | 8/1998 | Kawamura et al. .................... | 384/544 |

*Primary Examiner*—Thomas R. Hannon
*Attorney, Agent, or Firm*—Jacobson, Price, Holman & Stern, PLLC

[57] ABSTRACT

It is an object of the invention to provide a wheel bearing having a hub which can be worked without requiring different jigs and the like depending on the position to be worked, in which it is not required to dispose a dog or the like, and which is reduced in weight.

In a wheel bearing comprising a hub which is to be fixed to the side of a wheel, and an outer race which is to be fixed to the side of a vehicle body, a noncircular hole is formed in a center area of an inner side of an annular portion which is formed in the vicinity of the root of the flange of the hub which constitutes the wheel bearing, and in a side opposite to the shaft body in the axial direction.

1 Claim, 5 Drawing Sheets

WHEEL BEARING

BACKGROUND OF THE INVENTION

The invention relates to a wheel bearing which is disposed between a knuckle arm of a vehicle or the like and a driven wheel, and particularly to a wheel bearing which can prevent a flange of a hub attached to a wheel from being deformed and reduce the weight of the hub.

A wheel bearing such as shown in FIG. 4 is disposed between a knuckle arm and a wheel. The wheel bearing comprises: a hub 21 which is fixed to the side of a wheel; inner race members 24 and 25 which are fittedly fixed to a shaft body 21a of the hub 21; an outer race 22 which is fixed to the side of a vehicle body; balls 23 which are arranged between the hub 21 and the outer race 22; a nut 26 which fixes the inner race members 24 and 25 to the shaft body of the hub 21; and a seal member 27.

In the thus configured wheel bearing, the hub 21 is fixed at a flange 21f to the side of the wheel (not shown), and the outer race 22 is fixed at a flange 22f to the side of the vehicle body (not shown). The outer peripheral face 21b of the shaft body 21a of the hub 21, and the side face 21g of the flange 21f must be accurately worked. The nut 26 is fastened by using a dog 28 which is disposed on the inner side of an annular portion 21c that is at the root of the flange 21f of the hub 21 and in a side opposite to the shaft body 21a. However, the dog 28 interferes with the operation of working the hub 21, thereby making the working operation difficult to conduct. To comply with this, the hub 21 is worked in the following manner. As shown in FIG. 5, holes 21h and 21i are formed in both the sides of the center of the hub 21, and, while supporting the hub 21 by center jigs 30 and 31, a side face 21g of the flange 21f and the outer surface 21b of the shaft body 21a are machined. While the hub 21 is supported at the holes 21h and 21i by the center jigs 30 and 31, thereafter, the shaft body 21a is rotated via the dog 28 and the side face 21g of the flange 21f is polished. The outer surface 21b of the shaft body 21a is then polished by using a backing plate 32 and a shoe 33 with using the flange 21f as a reference. In the case where the holes 21h and 21i are axially misaligned with each other, when only the machining process is conducted, a desired accuracy may not be attained. The polishing processes are employed in order to improve the accuracy in such a case.

As described above, in the wheel bearing of the prior art, different jigs such as the center jigs 30 and 31, and the backing plate 32 and the shoe 33 are required in the processes of polishing the side face 21g of the flange 21f of the hub 21, and the outer peripheral face 21b of the shaft body 21a.

Therefore, the work is relatively cumbersome. In the case where the nut 26 is to be screwed and fastened, there is a problem in that, when the nut 26 is fixed by using the dog 28 as a rotation locking member, the flange 21f is easily deformed. Moreover, there is a further problem in that the formation of the dog 28 in the axial center area of the hub 21 increases the weight of the hub 21.

SUMMARY OF THE INVENTION

The invention has been conducted in order to solve the above-discussed problems. It is an object of the invention to provide a wheel bearing having a hub which can be worked while omitting a polishing step, in which it is not required to dispose a dog or the like, and which is reduced in weight.

In order to solve the problems, the wheel bearing of the invention comprises: a hub (1) having a flange (1f) which is to be fixed to a wheel side, and a shaft body (1a) to which an inner race member (4 or 5) is fittedly fixed; an outer race (2) having a flange (2f) which is to be fixed to a vehicle body side, and a raceway surface on an inner peripheral face; balls (3) which are arranged between the shaft body (1a) of the hub (1) and the outer race (2); and a nut (6) which is screwed to an end portion of the shaft body to which the inner race member (4 or 5) is fixed, and is characterized in that a noncircular hole (8) is formed in a center area of an inner side of an annular portion (1c) which is formed in the vicinity of a root of the flange (1f) of the hub (1) and in a side opposite to the shaft body (1a) in an axial direction.

DETAILED DESCRIPTION OF THE PREFERRED EMBODIMENTS

Hereinafter, a preferred embodiment of the invention will be described with reference to the accompanying drawings.

Figure 1:
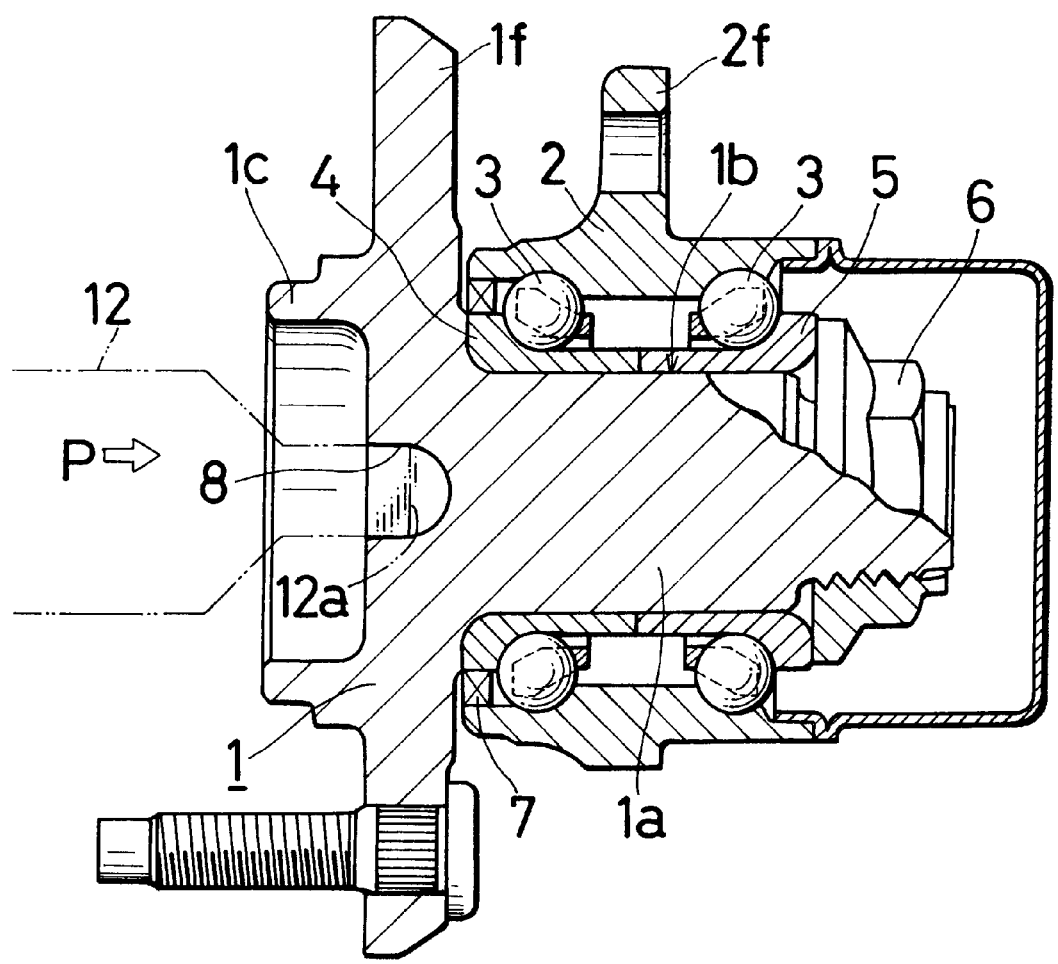
FIG. 1 is a partial section view of the wheel bearing of the invention, taken along the axial direction.
Figure 2:
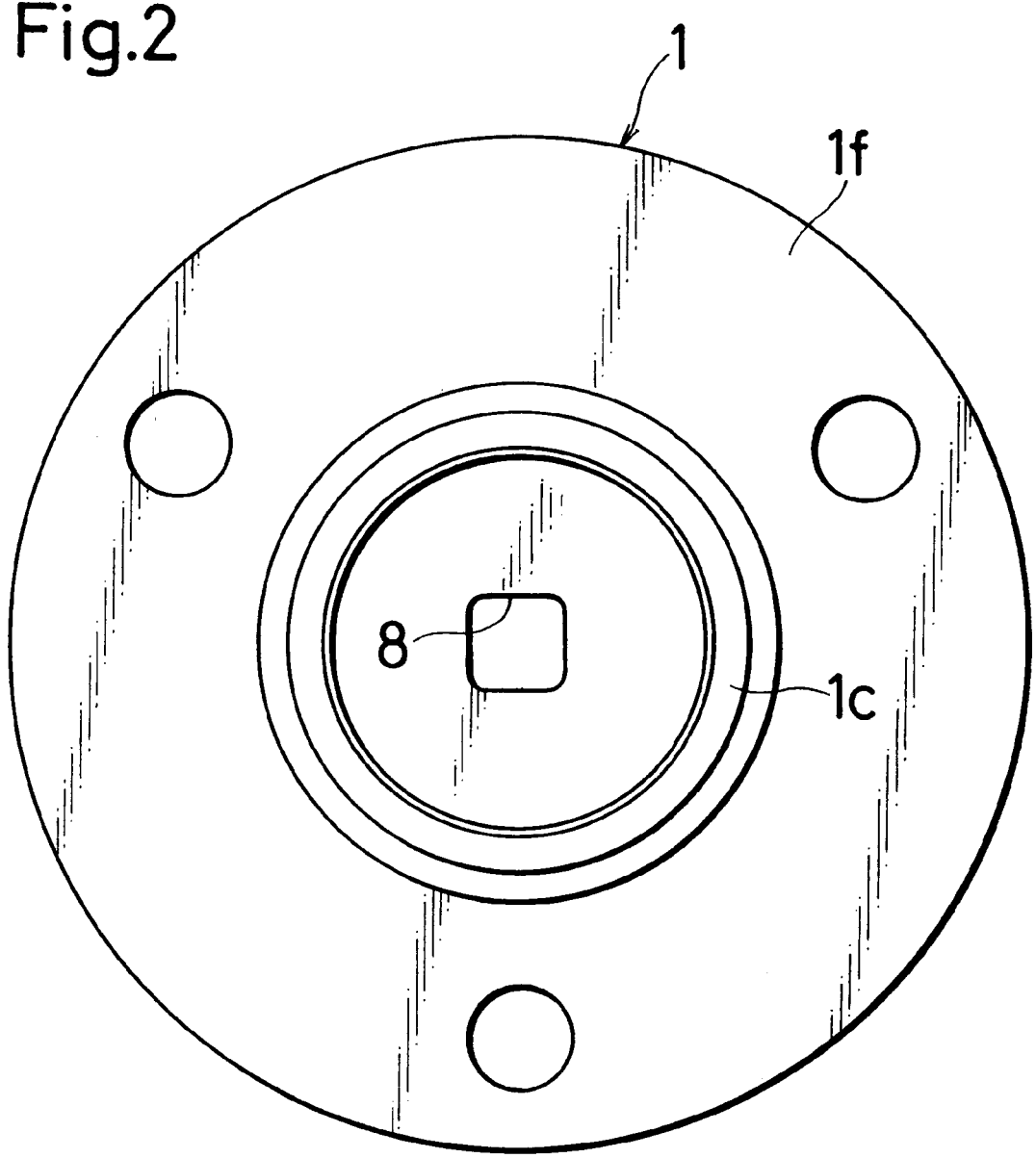
FIG. 2 is a front view of the wheel bearing of the invention, looking in the direction of the arrow P of FIG. 1.

FIG. 1 is a partial section view of the wheel bearing of the invention, taken along the axial direction, and FIG. 2 is a front view looking in the direction of the arrow P of FIG. 1. The wheel bearing comprises: a hub 1 having a flange If which is to be fixed to the side of a wheel (not shown); inner race members 4 and 5 which are fittedly fixed to the outer peripheral face 1b of a shaft 1a of the hub 1; an outer race 2 having a flange 2f which is to be fixed to the side of a vehicle body (not shown), and a raceway surface on an inner peripheral face; balls 3 which are arranged between the hub 1 and the outer race 2; and a nut 6 which is screwed to an end portion of the shaft 1a in order to fix the inner race members 4 and 5. Alternatively, the inner race member 4 may not be disposed on the shaft body 1a, and a raceway surface may be formed on the surface 1b of the shaft body 1a. The reference numeral 7 denotes a seal member.

An annular portion 1c is formed in the vicinity of the root of the flange if of the hub 1 and in a side opposite to the shaft body 1a in the axial direction. A rectangular hole 8 is formed in a center area of an inner side of the annular portion 1c. During an operation of fastening the nut 6, the hole 8 serves as "a rotation locking member" as described later, and hence may have any noncircular shape. Usually, the hub 1 is produced by forging, and the hole 8 is formed by a forging die.

Figure 3:
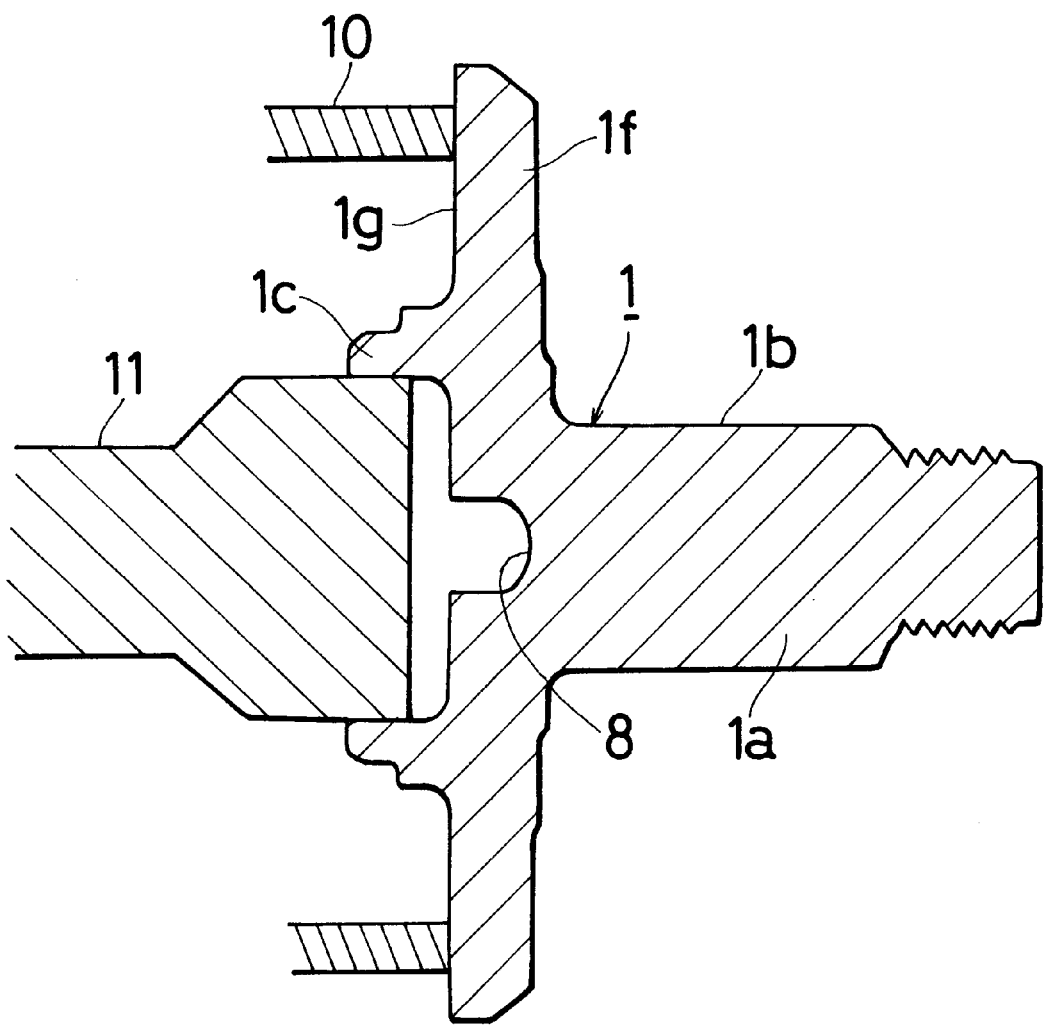
FIG. 3 is a section view of a hub of the wheel bearing of the invention, taken along the axial direction, and showing a state of working the hub.
Figure 4:
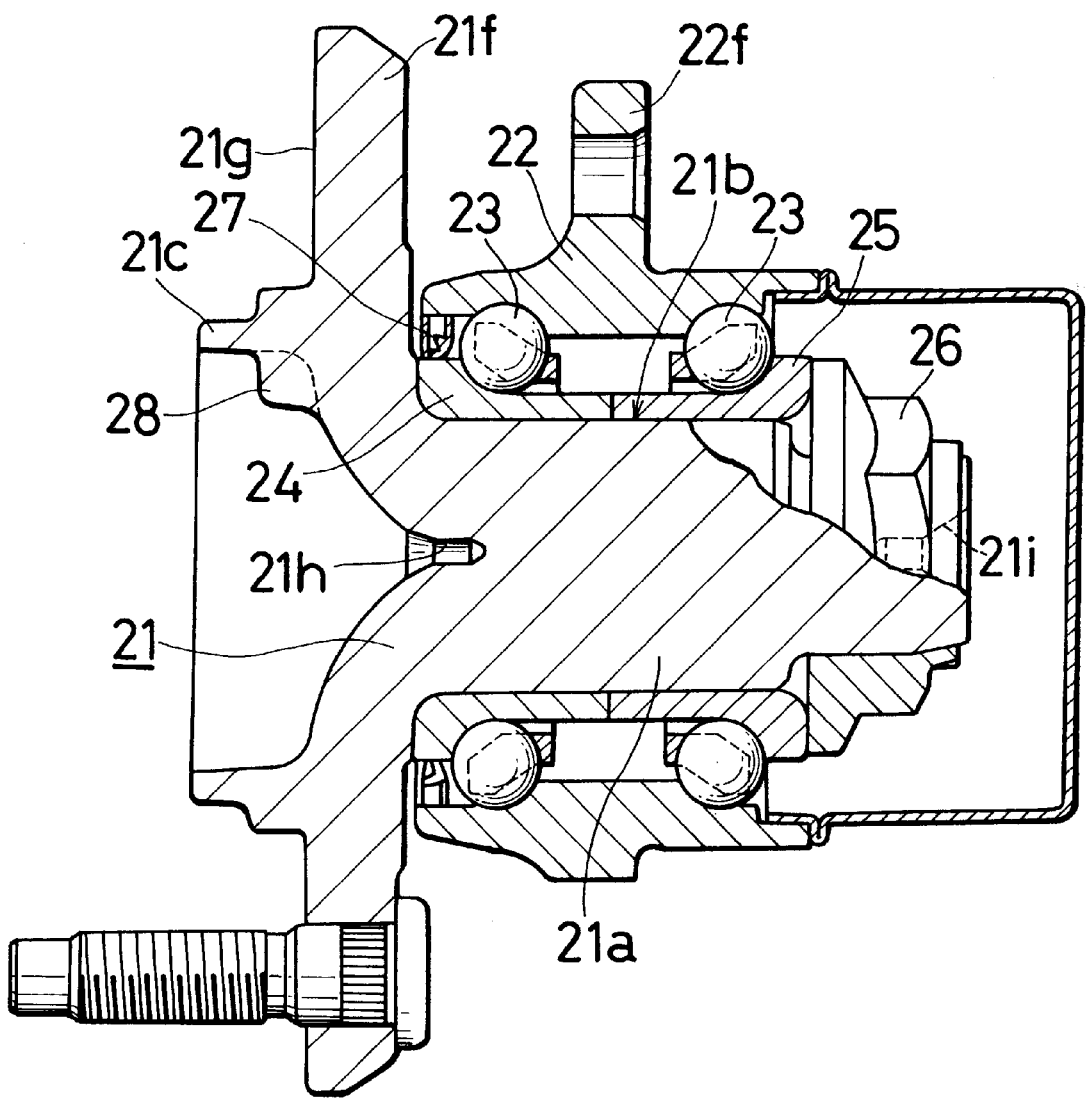
FIG. 4 is a partial section view of the wheel bearing of the prior art, taken along the axial direction.
Figure 5:
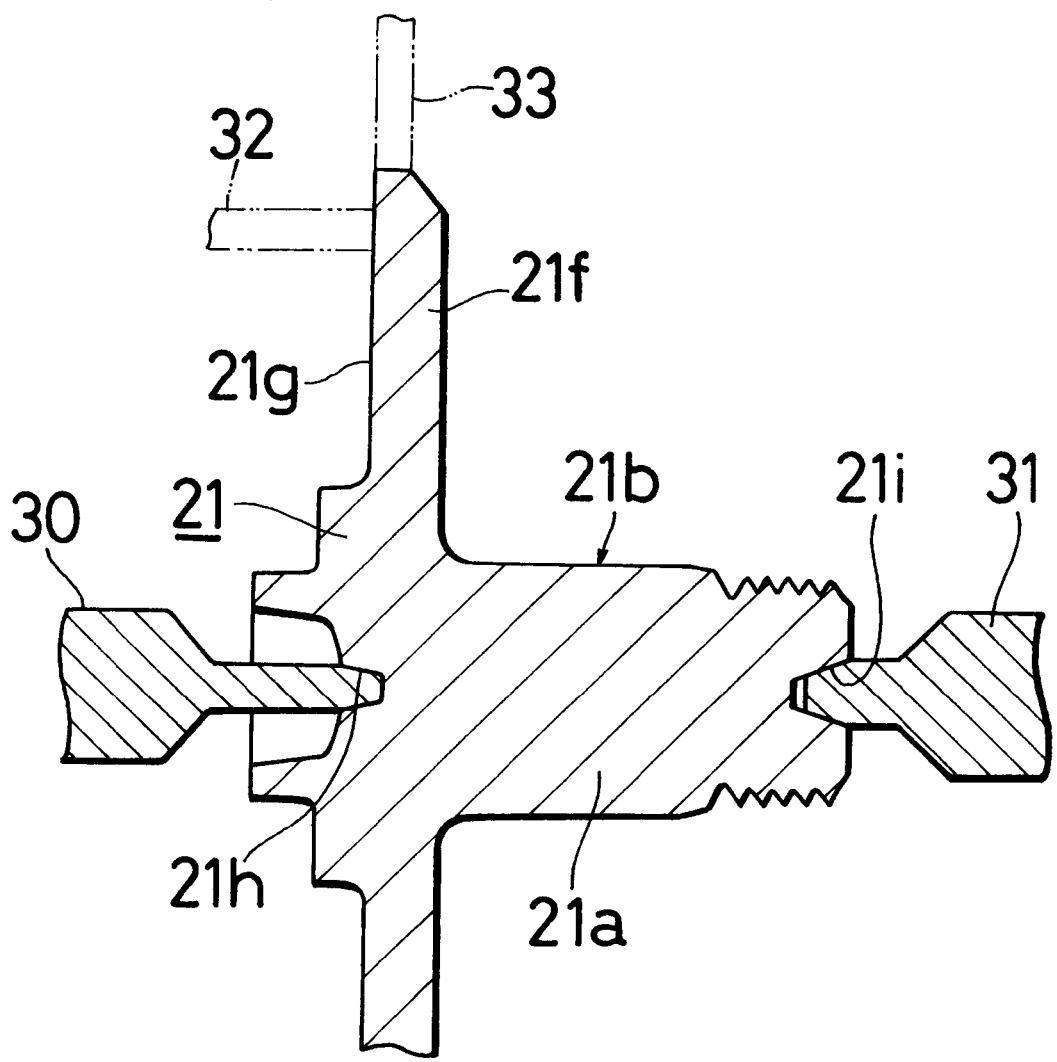
FIG. 5 is a section view of a hub of the wheel bearing of the prior art, taken along the axial direction, and showing a state of working the hub.

FIG. 3 is a section view of the hub 1, taken along the axial direction, and showing a state of working (cutting or polishing) the hub 1. A side face 1g of the flange 1f of the hub 1 is supported by a cylindrical shoe 10, and the inner peripheral face of the annular portion 1c is clamped by a chucking jig 11. Under this state, the hub 1 is rotated via the chucking jig 11, and the side face ig of the flange 1f and the outer peripheral face 1b of the shaft body 1a are machined.

Next, as shown in FIG. 1, the hub 1, the inner race members 4 and 5, the outer race 2, and the like are assembled together, and the nut 6 is then fastened. In this case, the operation of screwing and fastening the nut 6 is enabled only by fitting and fixing a tip end 12*a* of a jig 12 into the rectangular hole 8 formed in the inner center area of the annular portion 1*c* of the hub 1. In the fixing operation, therefore, it is not necessary to make a jig or the like abut against the flange 1*f*.

In the wheel bearing, as described above, a dog is not required to be disposed on the inner side of the annular portion 1*c* unlike the prior art. Under a state where the hub 1 is set by means of the shoe 10 and the chucking jig 11 as shown in FIG. 3, the side face 1*g* of the flange 1*f* and the outer peripheral face 1*b* of the shaft body 1*a* can be machined, resulting in accurate finishing. Therefore, a polishing step which is required in the prior art can be omitted. Since the hole 8 is formed by using a forging die, the production of the die is not particularly cumbersome as compared with that of the prior art.

As described above in detail, according to the wheel bearing of the invention, it is not required to use various kinds of jigs in the operation of working the flange of the hub and the surface of the shaft body, and the hub can be efficiently worked while being clamped by the same jig.

Therefore, a polishing step can be omitted. The process of assembling the wheel bearing can be conducted without applying a force to the flange, and hence the flange is not deformed. Moreover, it is not required to form a dog in the hub, and a noncircular hole is formed, with the result that the weight of the hub can be reduced.

What is claimed is:

1. A wheel bearing comprising: a hub having a flange which is to be fixed to a wheel side, and a shaft body to which an inner race member is fittedly fixed; an outer race having a flange which is to be fixed to a vehicle body side, and a raceway surface on an inner peripheral face; balls which are arranged between said shaft body of said hub and said outer race; and a nut which is screwed to an end portion of said shaft body to which said inner race member is fixed, wherein a noncircular hole is formed in a center area of an inner side of an annular portion which is formed in the vicinity of a root of said flange of said hub and in a side opposite to said shaft body in an axial direction.

* * * * *